United States Patent
Egger et al.

(10) Patent No.: US 8,463,505 B2
(45) Date of Patent: Jun. 11, 2013

(54) METHOD AND DEVICE FOR COMPUTER-AIDED DETECTION OF JAMMING OF AN OBJECT

(75) Inventors: Andreas Egger, Vienna (AT); Stefan Holzmann, Gaweinstal (AT); Roman Morawek, Vienna (AT)

(73) Assignee: Continental Automotive GmbH, Hannover (DE)

( * ) Notice: Subject to any disclaimer, the term of this patent is extended or adjusted under 35 U.S.C. 154(b) by 327 days.

(21) Appl. No.: 12/989,535

(22) PCT Filed: Mar. 24, 2009

(86) PCT No.: PCT/EP2009/053424
§ 371 (c)(1),
(2), (4) Date: Oct. 26, 2010

(87) PCT Pub. No.: WO2009/132900
PCT Pub. Date: Nov. 5, 2009

(65) Prior Publication Data
US 2011/0046856 A1    Feb. 24, 2011

(30) Foreign Application Priority Data
Apr. 29, 2008   (DE) .......................... 10 2008 021 383

(51) Int. Cl.
*B60R 22/00* (2006.01)

(52) U.S. Cl.
USPC .................................. 701/49; 702/41; 49/28

(58) Field of Classification Search
USPC ........................ 701/49; 702/41; 49/26, 28, 31
See application file for complete search history.

(56) References Cited

U.S. PATENT DOCUMENTS

| | | | |
|---|---|---|---|
| 6,456,027 B1 | 9/2002 | Pruessel | 318/445 |
| 6,504,332 B1 | 1/2003 | Lamm | 318/445 |
| 7,612,515 B2 | 11/2009 | Oxle | 318/466 |
| 7,690,152 B2 * | 4/2010 | Kobayashi et al. | 49/28 |
| 8,022,653 B2 * | 9/2011 | Oxle et al. | 318/460 |
| 2004/0183493 A1* | 9/2004 | Boisvert et al. | 318/469 |
| 2007/0084120 A1* | 4/2007 | Kobayashi et al. | 49/26 |
| 2007/0214722 A1* | 9/2007 | Oxle et al. | 49/31 |

FOREIGN PATENT DOCUMENTS

| | | |
|---|---|---|
| DE | 19908658 A1 | 8/2000 |
| DE | 19941475 A1 | 3/2001 |
| DE | 102006014612 | 10/2006 |
| EP | 0716492 | 6/1996 |
| WO | 2006/010349 A1 | 2/2006 |

OTHER PUBLICATIONS

German Office Action, German Patent Application No. 102008021383.7-31, 2 pages, Dec. 5, 2008.
International Preliminary Report on Patentability, PCT/EP2009/053424, 7 pages, Mar. 24, 2009.
International Search Report and Written Opinion for Application No. PCT/EP2009/053424 (11 pages), Jul. 21, 2009.

* cited by examiner

*Primary Examiner* — Helal A Algahaim
(74) *Attorney, Agent, or Firm* — King & Spalding L.L.P.

(57) ABSTRACT

In a computer-aided detection of the jamming of an object, wherein, when adjusting a component of a motor vehicle using an adjusting drive (6), measurement values related to the adjusting force (F) are compared to a prescribed threshold value (FR), initiating a slowdown, stop, or reversing of the adjusting motion when said value is reached. A spring rate correcting term characterizing the rigidity of the object is determined for correcting the relationship between the adjusting force (F) and the threshold value (FR), and is considered in the comparison.

13 Claims, 4 Drawing Sheets

METHOD AND DEVICE FOR COMPUTER-AIDED DETECTION OF JAMMING OF AN OBJECT

CROSS-REFERENCE TO RELATED APPLICATIONS

This application is a U.S. National Stage Application of International Application No. PCT/EP2009/053424 filed Mar. 24, 2009, which designates the United States of America, and claims priority to German Application No. 10 2008 021 383.7 filed Apr. 29, 2008, the contents of which are hereby incorporated by reference in their entirety.

TECHNICAL FIELD

The invention relates to a method and apparatus for the computer-aided detection of the pinching of an object when a component of a motor vehicle is adjusted with the aid of an adjusting drive, with measurement values relating to the adjusting force being compared with a predetermined threshold value, the reaching of which causes a slowing, stopping or reversing of the adjusting movement to be initiated.

BACKGROUND

When the adjustment of components in motor vehicles is actuated by external forces, for example in the case of electrically operated window raising mechanisms or sunroofs, an anti-pinch protection system is prescribed to limit the excess force generated by the adjusting drive. This anti-pinch protection system ideally recognizes a pinching incident immediately, by comparing adjusting force values currently determined in predetermined positions with a predetermined threshold value during an adjusting process. If the adjusting force applied by the motor rises above this threshold value, this indicates an obstacle in the adjustment path of the component and "pinching" is decided; the movement of the component is then stopped, the motor preferably also being reversed.

The anti-pinch protection system acts during the adjusting process at least within a partial region of the adjustment path, e.g. when a sliding window approaches a predetermined distance from the closing position, with current force values or variables correlated therewith, such as values of the window speed, motor speed, motor current etc. being determined at least in this partial region of the adjustment path at predetermined positions in quick succession, and corresponding values being compared as "force values" with the threshold value.

If the threshold value is exceeded, in the known systems time delays in the electrical circuit, for example an activation relay switching delay and generally mechanical inertia of the adjusting system and also the mechanical play contained therein mean that the adjusting movement is not stopped or reversed immediately but continues for a short time, in other words the pinching process continues before the adjusting movement is stopped and in some instances a movement reversal is initiated. Depending on the rigidity of the trapped object (e.g. a person's arm) this continued clamping increases the pinching force. This increase in the pinching force is naturally a function of how quickly the component, e.g. the window or sunroof, was being moved before the clamping process and how long the clamping continues. This increase in the pinching force, also referred to as an overshooting pinching force, is however also a function of the rigidity of the trapped object, as already mentioned above. Such a variation in the clamping force is not desirable. Ideally it should be possible to assume constant clamping forces for an optimally synchronized system, in order on the one hand to comply with the specified safety requirements and on the other hand to ensure the greatest possible safety margin in respect of a potential incorrect stopping and reversing of the movement of the motor vehicle component. Every fluctuation in the clamping force, as mentioned above also as a function of the rigidity of the object, however reduces this safety margin.

The reduction of the safety margin was generally accepted in the past and no measures were taken to compensate for the described phenomenon. However it has already been proposed here to adjust the threshold value for compensation purposes by an amount which is a linear function of the supply voltage. This change to the threshold value is based on the knowledge that the change in the adjustment speed of the respective motor vehicle component is initially caused by different vehicle electrical system voltages in the motor vehicle. However even with this procedure only unsatisfactory compensation for the clamping force fluctuations is possible, as the variation in adjustment speed is only partially caused by fluctuations in the vehicle electrical system voltage, in other words the supply voltage. Therefore, because other influencing variables bring about different adjustment speeds, such as for example fluctuations in the sluggishness of the mechanical system, which are in particular also caused by temperature fluctuations, it has also been proposed that such speed changes be taken into account. In principle such fluctuations in the pinching force due to speed changes are also to be compensated for on the basis that the cause, namely speed or voltage, is almost immediately known based on size. However this is not the case for pinching force fluctuations due to objects of differing rigidity (also referred to as differing spring rates).

Clamping force measurements for anti-pinch protection systems are often only measured using objects of identical rigidity, in other words identical spring rate, in particular at 10N/mm. The reason for this is that this spring value is specifically required in the European directive 2000/EC. If measurement only takes place with objects of identical rigidity, the problem of different clamping forces does not arise. In practice the trapped objects can be of different rigidity however. Therefore, and also in respect of the increasingly frequently required compliance with the US directive FMVSS 188, section S5, there is increasingly also requirement to cover spring rates of 20N/mm and 65N/mm.

In this instance in the past the systems were designed for the hardest object (i.e. for 65N/mm for example) and lower clamping forces were accepted for lower spring rates. However this results in a disadvantageous lower level of stability of the system in respect of incorrect triggering of the anti-pinch protection, also referred to as incorrect reversing.

SUMMARY

According to various embodiments, this can be remedied and improved anti-pinch protection can be provided in so far as objects of differing rigidity, i.e. different spring rates, are automatically to be taken into account in a pinching incident, so that on the one hand the desired safety margin can be ensured and on the other hand incorrect reversing or stopping can be prevented as far as possible.

According to an embodiment, in a method for the computer-aided detection of the trapping of an object when a component of a motor vehicle is adjusted with the aid of an adjusting drive, measurement values relating to the adjusting force being compared with a predetermined threshold value, the reaching of which causes a slowing, stopping or reversing of the adjusting movement to be initiated, wherein a spring rate correction term characteristic of the rigidity of the object is determined to correct the relationship between the adjusting force and the threshold value and taken into account during the comparison.

According to a further embodiment, when determining the correction term the rise of the measurement value curve relating to the adjusting force can be used. According to a further embodiment, when determining the correction term the first temporal derivation of the measurement value curve can be calculated and this derivation or a term containing the derivation can be multiplied by a predetermined proportionality factor. According to a further embodiment, the correction term obtained by derivation can be subtracted from the predetermined threshold value to determine a corrected threshold value. According to a further embodiment, the correction term obtained by derivation can be added to the determined measurement values relating to the adjusting force to determine corrected values relating to the adjusting force. According to a further embodiment, when determining the correction term an integrated value can be calculated for the measurement values relating to the adjusting force in a predetermined integration interval. According to a further embodiment, the correction term obtained by integration can be added to the predetermined threshold value to determine a corrected threshold value. According to a further embodiment, also when determining the correction term the first derivation of the measurement value curve can be calculated and this derivation or a term containing the derivation can be multiplied by a predetermined proportionality factor and the correction term is subtracted from the predetermined threshold value to determine a compensated threshold value.

According to another embodiment, an apparatus for the computer-aided detection of the trapping of an object when a component of a motor vehicle is adjusted with the aid of an adjusting drive, may comprise computation means for calculating the adjusting force of the adjusting drive or a variable correlated with the force, means for predetermining a threshold value, comparison means for comparing the calculated force or the correlated variable with the threshold value, and correction means for calculating a spring rate correction term characteristic of the rigidity of the object and for correcting the relationship between the adjusting force and the threshold value.

According to a further embodiment of the apparatus, the correction means can be set up to determine the correction term based on the gradient of a curve showing the profile of the calculated adjusting force. According to a further embodiment of the apparatus, the correction means may feature a differentiation module for calculating the first temporal derivation of the adjusting force curve and linking means for multiplying the derivation or a term containing said derivation by a predetermined proportionality factor, to determine the correction term. According to a further embodiment of the apparatus, the correction means may feature subtraction means connected to the linking means to subtract the correction term obtained from the predetermined threshold value. According to a further embodiment of the apparatus, the correction means may feature adding means connected to the linking means to add the correction term obtained by the derivation to the calculated force. According to a further embodiment of the apparatus, the correction means may feature an integration module for calculating an integrated value of the calculated force in a predetermined integration interval and linking means for multiplying the integrated value or a term containing said integrated value by a proportionality factor, to determine the correction term. According to a further embodiment of the apparatus, the correction means may feature adding means connected to the linking means to add the correction term to the predetermined threshold value. According to a further embodiment of the apparatus, the correction means may also feature a differentiation module for calculating the first temporal derivation of the adjusting force curve and linking means for multiplying the derivation or a term containing said derivation by a predetermined proportionality factor, to determine the correction term, subtraction means being connected to the linking means to subtract the correction term obtained by the derivation from the predetermined threshold value.

BRIEF DESCRIPTION OF THE DRAWINGS

The invention is described in more detail below based on exemplary embodiments, to which it should not however be restricted, and with reference to the drawing, in which.

DETAILED DESCRIPTION

With the present technology a spring rate correction term characteristic of the rigidity of the object is determined to correct the relationship between adjusting force and threshold value and taken into account during the comparison. This correction term is determined in particular as a correction term relating to the gradient of the adjusting force curve. This is based on the fact that when comparatively soft objects are pinched, a relatively flat profile or flat rise is present in the clamping force curve but when the objects are relatively rigid, there is a relatively steep rise in the pinching force, so that overshooting after reaching the threshold value results very quickly here in a high force value, until stopping or reversing intervenes and the clamping force drops again. In order to avoid such a high peak value after the pinching incident has been established, in other words to reduce the "overshoot" to a lower value, the threshold value should therefore be set correspondingly lower; instead the clamping force or adjusting force to be compared with the predetermined threshold value for the comparison can also be increased, so that in this instance too the threshold value is reached earlier. In both instances therefore the adjusting movement can be stopped and a reversal can in some instances be initiated earlier, compared with the situation according to the prior art, in other words without spring rate "compensation".

An extremely favorable procedure is therefore achieved if the first derivation of the measurement value curve is calculated when determining the correction term and the correction term is subtracted from the predetermined threshold value to determine a compensated threshold value. The differential correction term thus obtained can be deducted from the predetermined threshold value so that with a correspondingly steep rise in the clamping force or adjusting force curve the threshold value is reached earlier than with a flatter rise, the rigidity of the object or the spring rate being reflected in this rise (gradient).

The abovementioned differential correction term can however also be included directly in the force equation, instead of changing the trigger threshold, in other words the correction term obtained by derivation is added to the initially obtained measurement values relating to the adjusting force to determine "compensated" (corrected) values relating to the adjusting force.

Compensation here can be brought about in the respective instance—when calculating a "compensated" threshold value and with a "compensated" force value—by direct addition or subtraction of the correction term or even by taking the derivation term into account in a negative or positive manner with a correction multiplier. In this process a respective predetermined proportionality factor is applied when calculating the correction term.

A differential term in the threshold value calculation or force equation can in some instances means that the negative influence of potential synchronization problems of the mechanical system is amplified. It is then also possible to determine the correction term by integrating the adjusting force or values correlated therewith in an integration interval from the start of pinching onward. This alternative embodiment is based on the knowledge that a clamping process up to an established clamping force, e.g. 100N, lasts longer, the softer the clamped object is and the greater the integral. Therefore in the event of a fast rise a lower—compensated or corrected—threshold value is obtained here too and in the event of a relatively soft object a relatively high—corrected—threshold value is obtained. Of course the respective integrated value is also to be multiplied by a predetermined proportionality factor here too.

It is also advantageous to combine the above-mentioned integration method with the method in which the first derivation of the adjusting force is used in the period for determining an adjusted threshold value, in which process the detrimental effect due to the tendency of the mechanical system to have synchronization problems can be kept within limits. In this instance comparatively smaller proportionality factors should be predetermined in each instance (namely for the derivation term and for the integration term) to achieve the desired correction result overall.

It should be noted that instead of the calculated adjusting or closing force it is of course also possible to use variables correlated therewith, for example motor speed, motor current or values proportional thereto.

The present apparatus, which is provided with computation means for calculating the adjusting force of the adjusting drive, means for predetermining the threshold value and comparison means for comparing the calculated force with the threshold value, is correspondingly characterized by correction means for calculating a spring rate correction term characteristic of the rigidity of the object and for correcting the relationship between the adjusting force and the threshold value. The correction means are set up here, for simple correction term calculation, to determine the correction term based on the gradient of a curve showing the profile of the calculated adjusting force. It is also particularly advantageous here for the correction means to feature a differentiation module for calculating the first temporal derivative of the adjusting force curve and linking means for multiplying the derivation or a term containing said derivation by a predetermined proportionality factor, to determine the correction term. The correction means here can feature subtraction means connected in a simple manner to the linking means for subtracting the correction term thus obtained from the predetermined threshold value. This determines a corrected, "compensated" threshold value, which is correspondingly lower, the more markedly the adjusting force curve rises. The computation means, means for predetermining the threshold value, comparison means, and correction means comprise computer instructions stored in non-transitory computer-readable media and executable by at least one processor.

On the other hand the calculated force itself can be "corrected" according to the gradient of the curve, the correction means then featuring adding means connected to the linking means for adding the correction term obtained by the derivation to the calculated force.

As mentioned above, in some instances the correction result based on differential correction terms is in some instances detrimentally affected as a result of synchronization problems of the mechanical system and to avoid this it is also favorable if the correction means feature an integration module for calculating an integrated value of the calculated force in a predetermined integration interval and linking means for multiplying the integrated value or a term containing said integrated value by a proportionality factor, to determine the correction term. The linking means can be used to connect adding means for adding the correction term to the predetermined threshold value in a simple manner.

It should be noted that as an alternative to integration a low pass filter can also be used, allowing more economical implementation.

A further embodiment is obtained, if the correction means also feature a differentiation module for calculating the first temporal derivation of the adjusting force curve and linking means for multiplying the derivation or a term containing the derivation by a predetermined proportionality factor, to determine the correction term, with subtraction means for subtracting the correction term obtained by the derivation from the predetermined threshold value being connected to the linking means.

Figure 1:
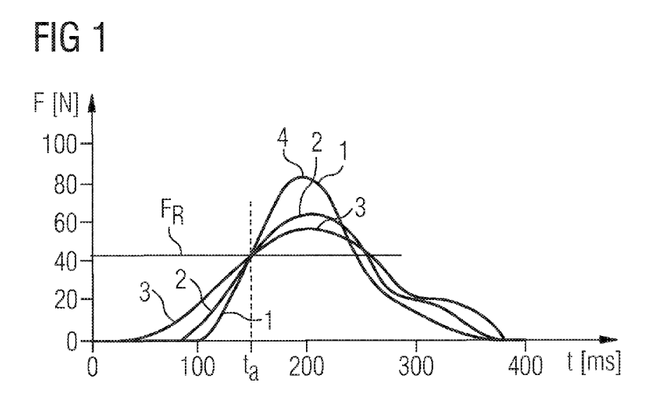
FIG. 1 shows a schematic diagram of the force profile of a pinching situation for objects of differing rigidity.

FIG. 1 shows the force profile for three objects of differing rigidity in a pinching situation, the respective force F (in N) being plotted over time t (in ms); specifically the curve 1 shows the force profile for a spring rate of 65N/mm, the curve 2—which is flatter than curve 1, with a less steep rise—shows the force profile for a spring rate of 20N/mm and the curve 3—which has the least steep rise—shows the force profile for a spring rate of 10N/mm. A predetermined, constant threshold value $F_R$ is also shown, with a stop and reverse process for the motor drive bringing about the force, for example for a window raising mechanism or a sunroof of a motor vehicle, being initiated when the respective adjusting force 1, 2 or 3 reaches or exceeds this threshold or reference value $F_R$. The switching delay here, for example due to an activation relay or even the mechanical inertia of the system and the mechanical play, however results in the motor drive and therefore the window or sunroof, etc. continuing to move for a short time, before the reversing process actually starts at a peak value, for example 4 for the curve 1 in FIG. 1, and the adjusting force drops again, as shown in FIG. 1.

The three adjusting force curves 1, 2 and 3 in FIG. 1, which are characteristic of different spring rates, show that this continued clamping, the "overshooting" of the clamping force, is a function of the rigidity of the pinched object, in other words the spring rate, it being clear that the peak value 4, at which the overshooting of the pinching force is terminated, is higher, the steeper the gradient of the clamping force curve 1, 2 or 3. It is also clear from FIG. 1 that if the entire system is designed for the most rigid (hardest) object in respect of predetermining the threshold value, in other words for 65N/mm for the instance shown, and therefore the threshold value is set approx. 20N lower, there may be unnecessary reversing, for example with objects having a spring rate of 10N/mm.

With the present technology provision is made for "detecting" the spring rate of the pinched object based on the different profile of the force rise and using this information to adapt the threshold value $F_R$ and/or the measured adjusting force F, in other words to correct or "compensate" the relationship between the threshold value and the measured force correspondingly. Therefore in the case of a rigid object clamping detection is triggered earlier in time, to which end either the threshold value is lowered with the aid of a correction term or the measured force is increased with the aid of a correction value for comparison purposes, with a comparable peak value resulting as for softer objects, due to the more marked but earlier starting subsequent force increase in the run out.

In order now to achieve a corresponding adjustment of the detection and trigger time $t_a$, it is possible to form for example the first temporal derivation of the rising profile of the force curve and use it to derive a correction term, which is linked linearly to the predetermined threshold value. This link can be as follows:

$$F_{R,corr}(t) = F_R(t) \cdot \left(1 - \frac{dF(t)}{dt} \cdot k_1\right) \quad (1)$$

or $$F_{R,corr}(t) = F_R(t) \cdot 1 - \frac{dF(t)}{dt} \cdot k'_1 \quad (1')$$

depending on whether compensation is to operate as a factor or just an added term.

Instead of the calculated closing force F(t), correlated variables, such as motor speed or motor current, can of course also be used in the derivation.

In the above equations (1) and (1')
$F_{R,corr}(t)$ is the corrected trigger threshold force, i.e. the corrected threshold value, at time t
$F_R(t)$ is the uncompensated trigger threshold force, as predetermined in the prior art, at time t (as mentioned above, the trigger threshold can be adapted as a function of voltage fluctuations and speed fluctuations, so that a time dependency can be present)
F(t) is the calculated closing force at time t,
$k_1$ is a proportionality factor (weighting parameter), which is system-dependent, can be determined empirically or by measurement in advance and determines the compensation influence, and
$k_1'$ is a corresponding proportionality factor for when the correction term is to operate as an "added" (specifically subtracted) term.

The differential correction term contained in the equations (1) and (1') can result in an amplification of the disadvantageous effect of possible synchronization problems of the respective mechanical system. Therefore an alternative or possibly also supplementary approach is proposed for detecting the spring rate in so far as the respective form of the force rise is taken into account by calculating an integral of the force rise. The softer the clamped object, the longer the clamping process, as shown in FIG. 1, and the greater therefore the integral value. The result of the integration is used again to adapt the clamping force or trigger threshold, in other words the predetermined threshold value $F_R$, in this instance however by actually taking into account the correction term additively, in order to raise the threshold value even more, the softer the clamped object. This threshold value adaptation can be written for example using the following equations:

$$F_{R,corr}(t) = F_R(t) \cdot \left(1 + k_2 \cdot \int_{t-t_{clamp}}^{t} F_{ext}(u)du\right) \quad (2)$$

or $$F_{R,corr} = F_R + k'_2 \cdot \int_{t-t_{clamp}}^{t} F_{ext}(u)du \quad (2')$$

Here the designations $F_{R,corr}$ and $F_R$ have the meanings given above; $k_2$ and $k_2'$ again designate system-dependent proportionality factors (weighting parameters); $t_{clamp}$ designates the respective integration interval (see also FIG. 5); and $F_{ext}$ designates the difference between the calculated closing force F and the expected closing force at time t. This difference, which is also expressed in the diagram in FIG. 1, can also, as shown below based on the block diagram according to FIG. 2, be determined later, so that instead of $F_{ext}$ in the equations (2) and (2') the calculated closing force F can simply be used.

The integration interval is advantageously selected so that it corresponds to the clamping time with the lowest spring rate.

Again the equations (2) and (2') show the two options which result from taking the correction term into account as a factor or as an added term.

The two correction term determinations set out above can also be combined with one another, as shown in the following equations (3) and (3'):

$$F_{R,corr}(t) = F_R(t) \cdot \left[1 - k_1 \cdot \frac{dF(t)}{dt} + k_2 \cdot \int_{t-t_{clamp}}^{t} F_{ext}(u)du\right] \quad (3)$$

and $$F_{R,corr}(t) = F_R(t) - k'_1 \cdot \frac{dF(t)}{dt} + k'_2 \cdot \int_{t-t_{clamp}}^{t} F_{ext}(u)du \quad (3')$$

It should be noted here that in the case of the equations (3) and (3'), in other words in the case of combined correction, the respective correction terms $k_1$, $k_2$ and $k_1'$, $k_2'$ should be selected as smaller than when only one or the other correction term determination takes place, according to the equations (1) and (1') or according to (2) and (2').

Instead of the threshold value adaptation described above, the adjustment can also take place directly with the pinching force, in other words the calculated clamping force is corrected ("compensated") correspondingly for the comparison with the threshold value. If
$F_{corr}(t)$ designates the closing force calculated with compensation at time t,
F(t) designates the closing force calculated without compensation according to the prior art at time t, and $k_3$ designates a weighting parameter (proportionality factor), which determines the influence of compensation, then $$F_{corr}(t) = F(t) \cdot \left(1 + \frac{dF(t)}{dt} \cdot k_3\right) \quad (4)$$

and $$F_{corr}(t) = F(t) + \frac{dF(t)}{dt} \cdot k_3' \quad (4')$$

This approach is similar to the first adjustment, according to the equations (1), (1'). But this similarity only applies for the pinching situation. If account is taken of the fact that the calculated closing force is also used as the basis for other calculations, for example for the algorithm for recognizing a poor road, it can be seen that the effect is different. ("Poor road recognition" is the recognition for example of fluctuations due to poor road conditions, for example the presence of potholes, cobbles, and the like, and these fluctuations are correspondingly recognized and regulated out).

Here too there are two options, depending on whether compensation is to operate as a factor or an additive term, according to the equation (4) or (4').

Figure 2:
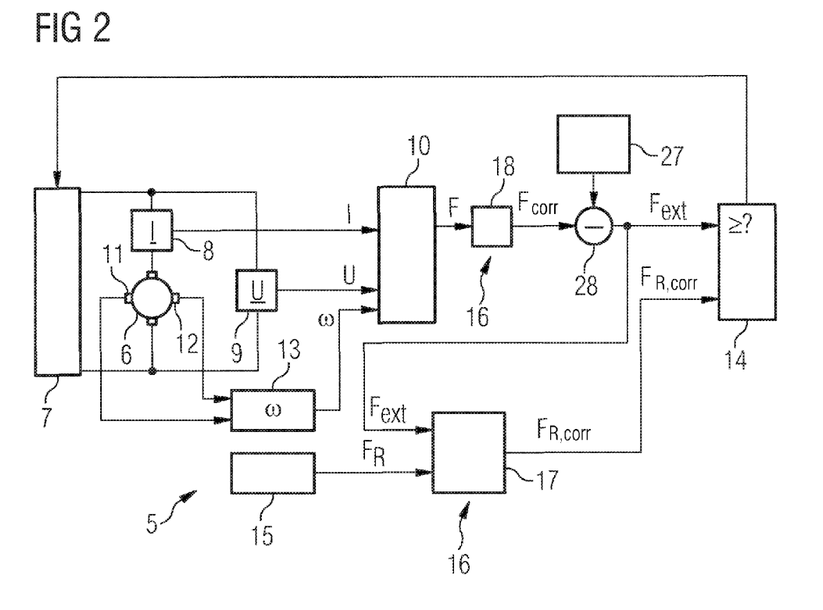
FIG. 2 shows a block diagram of the apparatus for detecting the pinching of an object in conjunction with an adjusting drive.

FIG. 2 shows a block diagram of a general example of a facility 5 for limiting the closing force of a component, e.g. a window or window raising mechanism (not shown in detail), of a motor vehicle with the aid of an electric motor 6 provided in the manner of an adjusting drive, referred to in short as a CFL (closing force limiting) facility 5. Power supply and activation means 7 are assigned to the motor 6. Means for capturing measurement values relating to the adjusting force are also provided, a current measurement circuit 8 and a voltage measurement circuit 9 for example being present, the outputs of which are applied to a force determination unit 10, to calculate the closing force F or a value relating thereto. This force determination takes place in a conventional manner per se and if the capturing of motor current I and motor voltage U is shown as a basis for this here, this should only be seen as exemplary, other options for force determination being known and possible, for example on the basis of motor speed; see for example also FR 2 663 798 A or the earlier DE application 10 2006 059 145.3. According to FIG. 2 the angular speed $\omega(t)$ of the motor 6 is also used to calculate the force F(t). To capture the angular speed $\omega$ of the electric motor 6, in particular in conjunction with capturing the position of the electric motor 6, as shown only schematically in FIG. 2, sensors that are standard per se 11, 12, e.g. Hall sensors, are shown schematically, their output signals being applied to a signal processing unit 13, in order to apply a signal relating to the angular speed $\omega$ to the unit 10, the "force calculation means".

A force value signal $F_{ext}$ is applied to an input of a comparison unit 14, which is supplied at its other input with a threshold value $F_{R,corr}$, which originates from a predetermination unit 15. When the threshold value is exceeded, the comparison unit 14 emits a corresponding signal to the activation means 7 to slow or stop the electric motor 6 or even reverse its direction of rotation.

The force determination unit 10 thus forms computation means for calculating the adjusting force F of the adjusting drive 6, and the comparison of the adjusting force with a trigger threshold, which is predetermined by the predetermination means 15 in a conventional manner, then takes place in the comparison means 14.

In order then to take into account the different spring rates, i.e. the objects of differing rigidity, which are pinched, correction and compensation means 16 are also provided according to FIG. 2, to adjust the relationship between the adjusting force and the threshold value, by adapting at least one of these two variables, to the respective spring rate.

In the example shown the correction means 16 specifically contain a threshold value correction unit 17 and also an adjusting force correction unit 18. The threshold value correction unit 17 here allows adaptation of the threshold value according to the above equations (1), (1'), (2), (2') and (3), (3'), while the adjusting force correction unit 18 allows adaptation of the adjusting force used for the comparison according to the equations (4) and (4').

Figure 3:
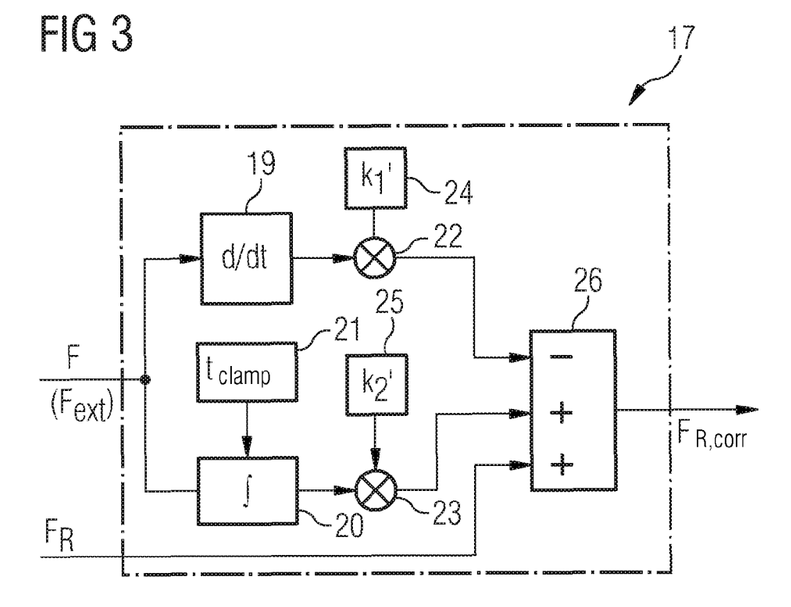
FIG. 3 show a block diagram of a part of said apparatus according to FIG. 2.

According to FIG. 3 the threshold value correction unit 17 of the correction means 16 contains on the one hand a differentiation module 19 and on the other hand an integration module 20, to which a predetermination unit 21 for the integration interval $t_{clamp}$ is assigned. Both modules are supplied in a parallel manner with the pinching force or adjusting force F or $F_{ext}$ (or a variable correlated therewith), so that said force or variable is on the one hand constantly differentiated and on the other hand integrated in the integration interval $t_{clamp}$ (see FIG. 5). The differentiated or integrated values obtained are then multiplied with the aid of linking means (multiplier means) 22 and 23 by the respective proportionality factors $k_1'$ and $k_2'$, which are supplied by corresponding predetermination modules 24 and 25. The outputs of the multiplier means 22, 23 thus supply the differential or integral correction terms contained above in the equations (1') and (2'), which are applied to an inverting (−) input or a + input of summing means 26; a further + input of said summing means 26 is supplied with a threshold value $F_R$ predetermined by the predetermination means 15 and determined in the conventional manner. At the output of the summing means 26, which thus form both subtracting means and adding means, the threshold value $F_{R,corr}$ adapted according to the gradient of the force curve 1, 2 or 3 is obtained. This threshold value $F_{R,corr}$ is supplied to the comparison means 14 according to FIG. 2 and compared there with the overshoot force $F_{ext}$, said overshoot force being above the mechanical response, in other words exceeding the expected value. The normal mechanical response is taken into account according to FIG. 2 by a reference force predetermination unit 27 by means of subtraction means 28, to subtract the expected force $F_{ext}$ from the calculated force F (in some instances from the force $F_{corr}$ corrected in the unit 18).

If with the unit 17 according to FIG. 3 only either the differential correction or the integration correction is desired, this can be achieved in a simple manner by setting the corresponding—other—proportionality factor $k_2'$ or $k_1'$ equal to zero.

Before looking in more detail at the unit 18 based on FIG. 6, the mode of action of the unit 17 should be explained in more detail with reference to FIGS. 4 and 5.

Figure 4:
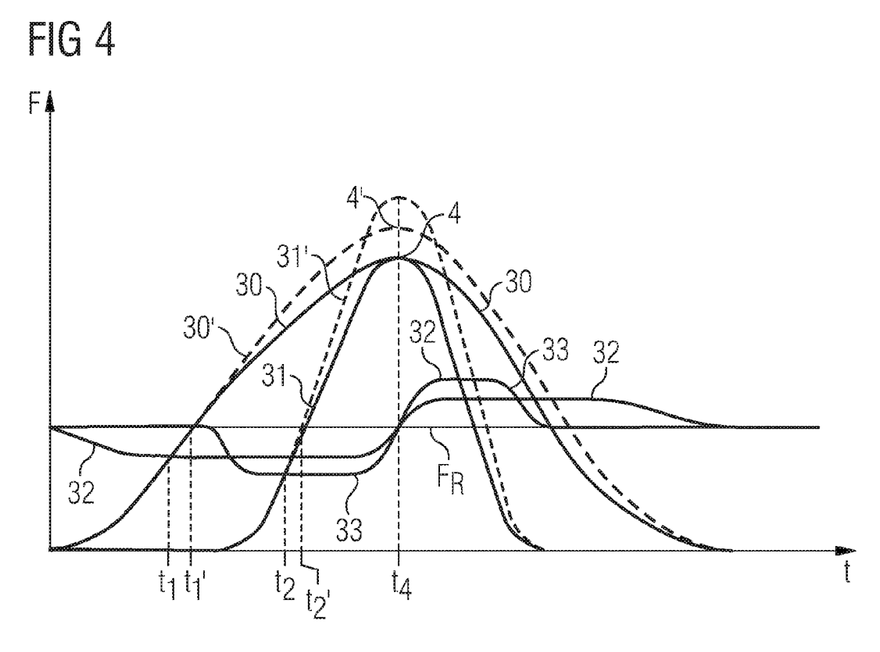
FIGS. 4 and 5 show diagrams with schematically illustrated force profiles, FIG. 4 showing two threshold value profiles corrected with the aid of differential correction values for two different spring rates and FIG. 5 showing threshold values corrected with the aid of an integration correction value in this instance for two different spring rates.
Figure 5:
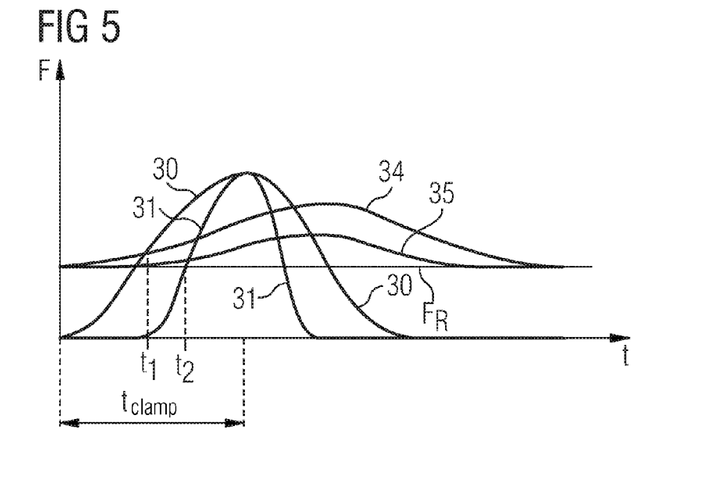

FIG. 4 specifically shows two force curves 30, 31 for two different spring rates, as may occur in a pinching incident with objects of differing rigidity. The diagram according to FIG. 4 also shows the uncompensated force threshold $F_R$—as a constant trigger threshold for the sake of simplicity here.

The force profiles 30 and 31 already describe the force profile as occurs with a compensated system (the peak values are of identical height for this reason). FIG. 4 also shows the uncompensated force profiles with two broken lines 30', 31'. These both lie above the curves 30 and 31; the peak value of the uncompensated 10N/mm curve 30' is below that of the uncompensated 65N/mm curve 31'. These broken-line curves 30', 31' would correspond to triggering at times $t_1'$ and $t_2'$.

According to the curves 30', 31' the force starts to rise above the expected value assumed to be zero and without compensation the comparison with the threshold value $F_R$ would cause a pinching incident to be detected at time $t_1'$ or $t_2'$, with the adjusting drive (motor 6) being stopped or reversed after the described overshoot up to a peak value 4' at a time $t_4$, resulting in the falling branch of the curves 30', 31'.

FIG. 4 specifically shows the correction of the threshold value according to the differentiation method for two different spring rates, namely 10N/mm (curve 30) and 65N/mm (curve 31) and the associated corrected threshold values 32 (for spring rate=10N/mm) and 33 (for spring rate=65N/mm).

The described differential correction, with the aid of the differentiation module 19 and the multiplier means 22, results in an adjustment or correction, also referred to as compensation, of the threshold value $F_{R,corr}$ according to the curves 32 and 33 shown in FIG. 4, the threshold value $F_{R,corr}$ in the critical region being lower (due to subtraction of the correction term) than the predetermined threshold value $F_R$, so that the pinching incident is detected and reversal of the motor 6 is triggered at an earlier time, e.g. $t_1$ for the curve 30 and $t_2$ for the curve 31. This results in a lower peak value 4.

FIG. 5 again shows two curves 30 (for a spring rate of 10N/mm) and 31 (for a spring rate=65N/mm) and associated corrected threshold value profiles 34 (for spring rate=10N/mm) and 35 (for spring rate=65N/mm) obtained by integrating the adjusting force. The uncompensated conventional predetermined threshold value $F_R$ is also shown—again as a constant trigger threshold. The integration interval $t_{clamp}$ used is also shown schematically, over which integration is ongoing, while the force according to the curve 30 or 31 rises. As shown, at trigger time $t_2$ here there is a higher threshold value 34 for softer pinched objects compared with the lower threshold 35 for harder objects, according to the force curve 31, at trigger time $t_2$, so that the desired comparatively early detection of the pinching situation for high spring rates is achieved here too.

Figure 6:
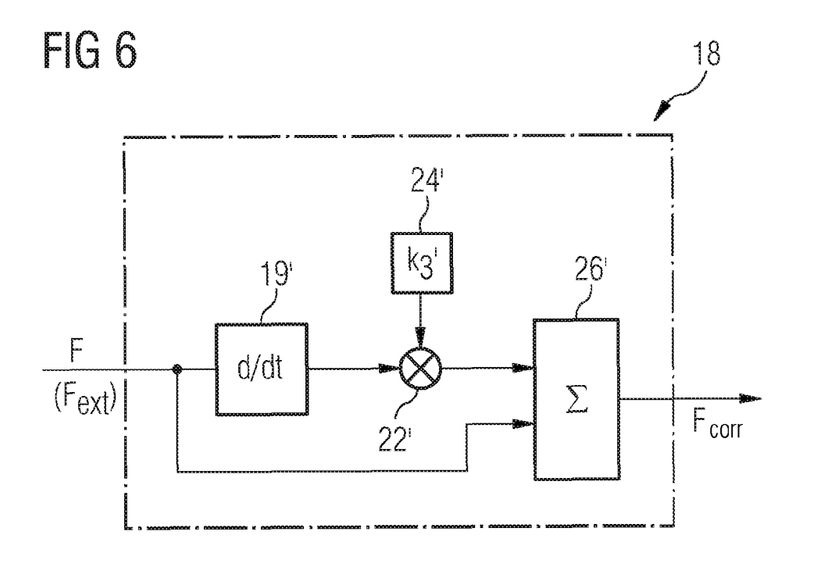
FIG. 6 shows a block diagram of a different part of the apparatus according to FIG. 2, for the provision of a differential correction term during the adjusting force calculation.

FIG. 6 shows the adjusting force correction unit 18 from FIG. 2 in one possible embodiment, in which the adjusting force F itself is corrected ("compensated") according to the respective spring rate. The unit 18 in turn contains a differentiation module 19' (which can in theory also be the differentiation module 19 from FIG. 3), with downstream multiplier means 22' (for the realization of which the multiplier means 22 according to FIG. 3 can also be used); a proportionality factor predetermination unit 24' is also provided to predetermine the factor $k_3'$, so that the differentiated force value $$\frac{dF}{dt}$$

can be multiplied by this factor $k_3'$ and then added in adding means 26' to the force value F. At the output of said adding means 26' the corrected force value $F_{corr}$ according to the above equation (4') (or a variable correlated with this force $F_{corr}$) is obtained, which is then subjected, taking into account the expected force value, see FIG. 2, to the comparison with the—in this instance for example uncompensated threshold value $F_R$—in the comparison means 14. (The subtraction of the expected force value, see unit 27 in FIG. 2, can also take place before the correction means 16, for which reason in FIG. 6 and also in FIG. 3 both F and also—alternatively—$F_{ext}$ are given as the input variable).

Figure 7:
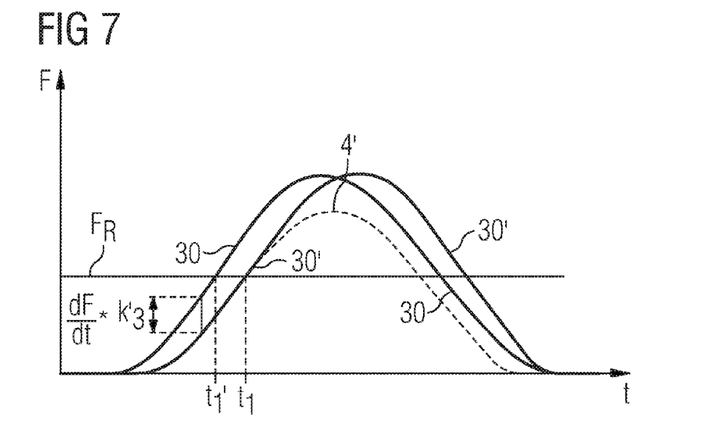
FIG. 7 shows a diagram to illustrate the profile of an adjusting force during pinching without and respectively with a force value correction with the aid of a differential correction value.

The unit 18 can be provided additionally or instead of the unit 17 according to FIG. 2; both units 17, 18 are preferably present and, depending on the situation, in the corresponding proportionality factor predetermination means 24, 25 or 24' the proportionality factors $k_1'$, $k_2'$ or $k_3'$ are set to zero, to obtain the desired form of correction. It is also conceivable to combine the units 17 and 18 to form a common unit, having a common summing stage 26, it being possible to switch the individual signal paths to active or to deactivate them by way of logical values (not shown). This summing stage would then also have to be supplied with the calculated force F at a further input compared with the situation according to FIG. 3, and the upper differentiation branch, with the differentiation module 19, could be used for a correction of either the threshold value or the force, depending on the setting of the proportionality factor with the aid of the means 24 and depending on activation of either the threshold value input or the force input in the summing stage 26.

Where the adjusting force is corrected, as shown in detail in FIG. 6, a de facto displacement of the force curve 30' results according to FIG. 7 (for the uncompensated instance) forward in time, see also the curve 30 for the corrected force $F_{corr}$. This curve 30 is obtained from the curve 30' by constantly adding the correction term $$\frac{dF}{dt} \cdot k_3,$$

as shown in FIG. 7. As a result the pinching situation is again detected at an earlier time $t_1'$, compared with the time $t_1$ in the uncompensated instance, resulting in a lower actual adjusting force curve, having a correspondingly lower peak value 4'.

The forward displacement of clamping detection in time is greater, the higher the rise of the force curve. A greater drop of the peak point 4 therefore takes place, corresponding to the desired effect.

Figure 8:
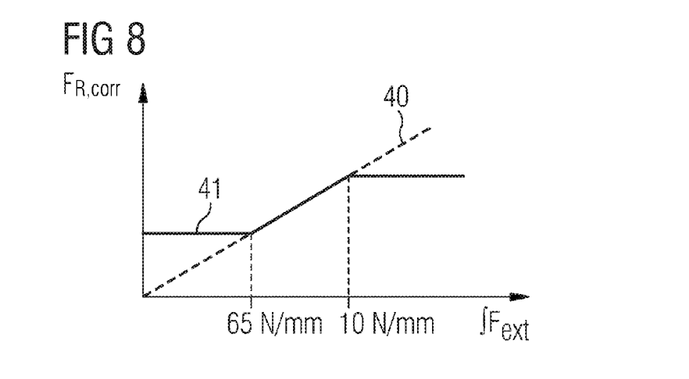
FIG. 8 shows a schematic diagram to illustrate the restriction of compensation or correction to the range between the predetermined softest and hardest objects to be pinched.

To increase system stability, threshold value compensation is advantageously restricted to the range that occurs generally with clamping situations, see the schematic diagram in FIG. 8. The broken line 40 in FIG. 8 shows the compensation profile corresponding to the apparatus 18 and the line 41 shows the advantageous restriction of compensation to the useful range, in other words for example the range between 65N/mm and 10N/mm.

What is claimed is:

1. A method for the computer-aided detection of the pinching of an object when a component of a motor vehicle is adjusted with the aid of an adjusting drive, the method comprising:
   executing computer instructions stored in non-transitory computer-readable media to:
   calculate an integral of a curve of an adjusting force over time during a time interval due to a pinching of the object by an adjusting movement of the adjusted component,
   calculate an object rigidity correction factor based on the calculated integral of the adjusting force curve during the time interval,
   determine whether to initiate a slowing, stopping or reversing of the adjusting movement based on (a) measurement values relating to the adjusting force, (b) a predetermined threshold value, and (c) the calculated object rigidity correction factor.

2. The method according to claim 1, further comprising:
   calculating a first temporal derivative of the adjusting force curve, and calculating the object rigidity correction factor based on the calculated integral of the adjusting force curve and the calculated derivative of the adjusting force curve.

3. The method according to claim 2, wherein the first temporal derivative of the adjusting force is subtracted from the predetermined threshold value to determine a corrected threshold value.

4. The method according to claim 2, wherein the first temporal derivative of the adjusting force is added to the determined measurement values relating to the adjusting force to determine corrected values relating to the adjusting force.

5. The method according to claim 1, wherein the object rigidity correction factor calculated by integration is added to the predetermined threshold value to determine a corrected threshold value.

6. An apparatus for the computer-aided detection of the pinching of an object when a component of a motor vehicle is adjusted with the aid of an adjusting drive, comprising:
   computation means configured to calculate an adjusting force of the adjusting drive or a variable correlated with the adjusting force,
   means for predetermining a threshold value,
   correction means for:
      calculating an integral of a curve of the adjusting force over time during a time interval due to a pinching of the object by an adjusting movement of the adjusted component, and
      calculating an object rigidity correction factor based on the calculated integral of the adjusting force curve during the time interval, and
   comparison means for comparing the calculated force or the correlated variable with the threshold value, and accounting for the object rigidity correction factor, to determine whether to initiate a slowing, stopping or reversing of the adjusting drive.

7. The apparatus according to claim 6, wherein the correction means are further configured to:
   calculate a gradient of the adjusting force curve, and
   calculate the object rigidity correction factor based on the calculated integral of the adjusting force curve and the calculated gradient of the adjusting force curve.

8. The apparatus according to claim 1, wherein the correction means comprise a differentiation module for calculating a first temporal derivative of the adjusting force curve and linking means for multiplying the derivative or a term containing said derivative by a predetermined proportionality factor, to determine a correction term.

9. The apparatus according to claim 8, wherein the correction means comprise subtraction means connected to the linking means to subtract the correction term obtained from the predetermined threshold value.

10. The apparatus according to claim 8, wherein the correction means comprise adding means connected to the linking means to add the correction term obtained by the derivative to the calculated force.

11. A system for the computer-aided detection of the pinching of an object comprising:
   a component of a motor vehicle to be adjusted with the aid of an adjusting drive,
   a control unit coupled with said adjusting drive,
   a sensor unit coupled with said adjusting drive and being operable to measure a adjusting force of said adjusting drive;
   a force determination unit receiving a value representing said adjusting force,
   the control unit configured to:
      calculate an integral of a curve of the adjusting force over time during a time interval due to a pinching of the object by an adjusting movement of the adjusted component,
      calculate an object rigidity correction factor based on the calculated integral of the adjusting force curve during the time interval,
      controlling the adjusting drive based on (a) measurement values relating to the adjusting force, (b) a predetermined threshold value, and (c) the calculated object rigidity correction factor.

12. The system according to claim 11, wherein the control unit is configured to:
   calculate a first temporal derivation derivative of the adjusting force curve, and
   calculate the object rigidity correction factor based on the calculated integral of the adjusting force curve and the calculated derivative of the adjusting force curve.

13. The system according to claim 12, wherein the first temporal derivative of the adjusting force is subtracted from the predetermined threshold value to determine a corrected threshold value.

* * * * *